United States Patent

[11] 3,534,676

| [72] | Inventor | Robert A. Rubino<br>Milford, Connecticut |
|------|----------|------------------------------------------|
| [21] | Appl. No. | 713,470 |
| [22] | Filed | March 15, 1968 |
| [45] | Patented | Oct. 20, 1970 |
| [73] | Assignee | Mars Research & Design Corporation<br>Fifty-one percent interest to<br>a corporation of New Jersey |

[54] VENDING MACHINE WITH FAST COOKING MEANS
5 Claims, 9 Drawing Figs.

[52] U.S. Cl.................................................. 99/355,
99/174, 99/189, 99/327, 99/357, 99/443, 221/86, 221/150
[51] Int. Cl.................................................. A47j 27/62
[50] Field of Search........................................ 99/332,
334, 335, 357, 443, 448, 327, 355; 221/150, 78, 81, 84, 86; 99/174, 189

[56] References Cited
UNITED STATES PATENTS

| 2,501,712 | 3/1950 | Chodziesner.................. | 99/357 |
| 2,714,070 | 7/1955 | Welch.......................... | 99/174UX |
| 2,950,024 | 8/1960 | Adler........................... | 99/357UX |
| 3,224,361 | 12/1965 | Ojelid........................... | 99/357X |
| 3,233,536 | 2/1966 | Ignelzi......................... | 99/357 |
| 3,333,666 | 8/1967 | Murray et al.................. | 99/357UX |
| 3,335,656 | 8/1967 | Smith........................... | 99/357 |
| 3,343,479 | 9/1967 | Wassberg...................... | 99/357 |
| 3,360,382 | 12/1967 | Miller........................... | 99/189X |
| 3,398,672 | 8/1968 | Hoeberigs...................... | 221/150X |

Primary Examiner—Billy J. Wilhite
Attorney—Edward M. Farrell

ABSTRACT: A vending machine includes means for preserving over a long period of time food to be cooked, a microwave oven for fast cooking and means for selectively inserting the food into the oven. The food may be refrigerated or specially packaged and stored within the vending machine. In response to the correct change being put into the vending machine, the oven receives a package of food and then closes. The oven is then actuated to cook the food. The cooked food is then dispensed to the purchaser.

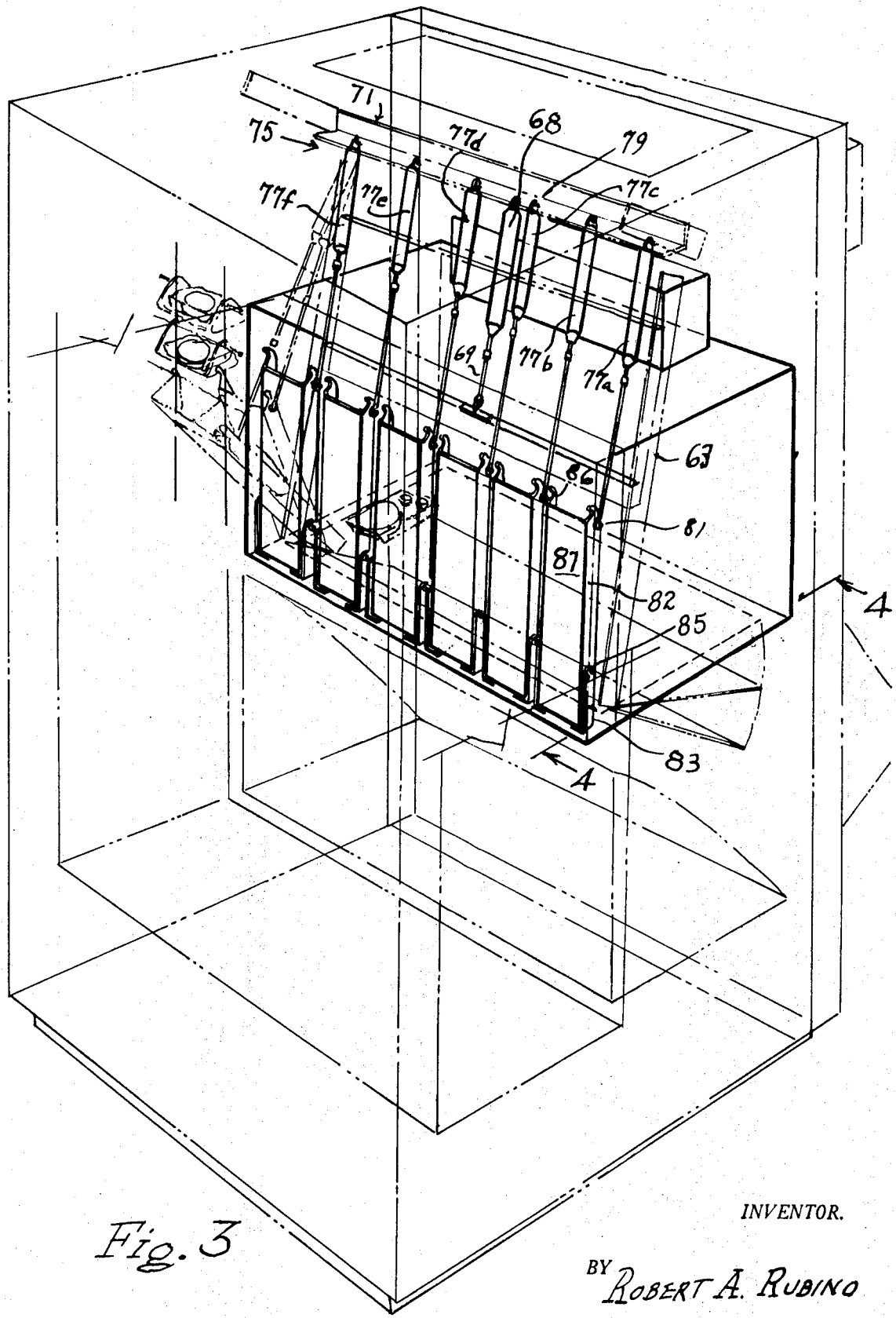

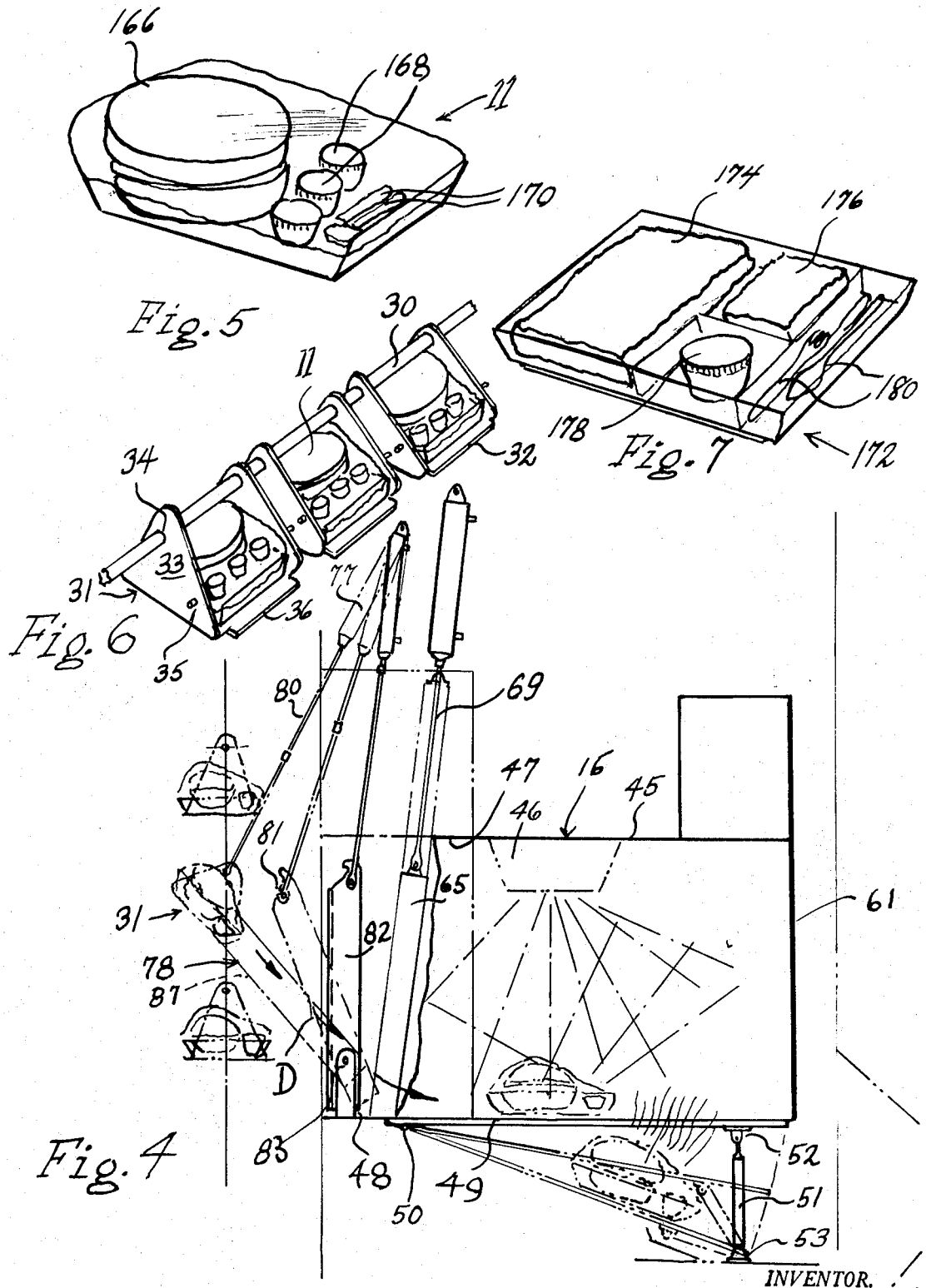

INVENTOR.
BY Robert A. Rubino

INVENTOR.
BY ROBERT A. RUBINO

VENDING MACHINE WITH FAST COOKING MEANS

Food vending machines have come into widespread use in recent years. It is well know at the present time to utilize vending machines which store not only the nonperishable items, but which also store and dispense perishable food items.

Notwithstanding the advances which have been made in the vending machine field, there remains a need for a simply constructed and efficiently operable vending machine capable of storing and preserving foods to be cooked and then selectively cook and dispense a package of food in seconds.

Vending machines for heating and dispensing food in response to the insertion of the correct change by a consumer are well known. Such machines have been used to dispense coffee and other liquids, as well as solid food articles, such as frankfurters. In the case of liquids, the liquids or water to be mixed with a solid are generally maintained in a hot condition and are dispensed instantly to the consumer. In the case of solid food, however, a heating cycle is generally involved requiring a waiting time before the cooked food is dispensed to the consumer. In general, food cannot be maintained in a cooked hot eatable condition for a long period of time. Also, unless the food is stored properly, the taste or other characteristics starts to change. Ideally, it would be desirable to store and preserve large amounts of food indefinitely and still be able to selectively dispense portions or packages of the food in a cooked condition instantly when a consumer inserts the correct change into a vending machine.

It is well known that microwave cookers may be used for fast cooking. In microwave ovens, the microwave energy is usually confined within the cooking compartment by means of metal walls or screens. The cooking compartment is generally a resonant cavity in which the object to be heated is placed, usually a foodstuff or other lossy dielectric substance, and wherein means are provided to couple microwave energy into the cavity. The heating of the food mass is accomplished by the penetration of microwave energy into the food mass and the resultant agitation of molecules within the food mass. The molecular friction produced results in the generation of heat that cooks the food in a relatively short time. While microwave cooking solves the problem to fast cooking, its use poses problems when it is associated with vending machines of the type presently used on the market to dispense cooked food. For example, when contemplating vending machines, the inlet and outlet openings to and from the microwave oven must be generally be provided. These openings tend to cause leakage and radiation of ultra high frequency energy to the exterior of the chamber. Radiation outside of the chamber is not only undesirable because of the reduced amount of energy available for heating within the chamber but also constitutes a safety hazard to personnel in the vicinity. The maximum average power density that is considered safe for humans is 10 millwatts per square centimeter. It can readily be appreciated that this level may be easily exceeded when a heating chamber is operated at an imput of 1 kilowatt or more, unless adequate means are provided to block the escape of this energy.

The problem of fast cooking in vending machines is accompanied by the problem of providing an efficient means for preserving and storing large amounts of food. Packaging of foods in flexible transparent wrappers has developed into a highly specialized art in recent years. Advantages to be realized from such packaging include an improved retention of color, flavor, and other properties. Such packages for food formed from flexible transparent films may either be under reduced pressure or may contain an inert gas under a slightly positive or atmospheric pressure. While such packages have been used for packing and preserving food to some extent, it is generally contemplated that the coverings on the packages be removed prior to cooking. In fact, in most cases, if an attempt to cook the food within the package were made, it is likely that the covering would ignite.

When the problems relating to storing and cooking are considered, it is apparent that special consideration must be given to the transfer means between the storing device and the cooker. It is desirable that such transfer means be not only safe, but, in addition provide fast, efficient and quiet operation.

In contemplating a food package for dispensing by a vending machine, it is often desirable to have some of the items within the package cooked or heated with other items remaining uncooked. For example, a typical food package could include a hamburger to be cooked, condiments, such as catsup or mustard, another food to be cooked or uncooked and eating utensils, such as plastic knives or forks. In these cases, it would be desirable to provide means for heating selected items while not heating others or provide some means for heating items to different temperatures.

In considering a vending machine for the fast cooking of hamburgers or the like, for example, some consideration should be given to the preferences of the consumers, i.e. whether the cooked hamburgers should be rare, medium or well done.

At the same time in providing the desirable features mentioned above, a vending machine for fast cooking should be adaptable to features found in conventional machines. These features include indications when the machine is empty, coin return, safety and other features.

It is an object of this invention to provide an improved vending machine which has an improved speed of operation thereby reducing the waiting time of a purchaser of cooked food.

It is a further object of this invention to provide an improved vending machine in which food to be cooked may be stored over relatively long periods of time with or without refrigeration.

It is still a further object of this invention to provide a novel transfer mechanism for transferring food to be cooking from a storage area to an oven.

It is still a further object of this invention to provide an improved vending machine for fast cooking wherein a microwave oven is used for cooking and wherein means are provided to selectively insert a package of food into the oven and wherein adequate protective shielding means is provided to prevent radiation of energy during the cooking cycle after the package of food has been transferred.

It is still a further object of this invention to provide an improved vending machine for fast cooking of food wherein a purchaser of the food may select the degree of cooking desired.

It is still a further object of this invention to provide an improved package for storing food to be dispensed into a fast cooking oven within a vending machine wherein the package is pervious to microwave energy to permit the food therein to be cooked without excessive heating of the package itself.

It is still a further object of this invention to provide an improved package for holding food to be cooked wherein certain items within the package may be packaged in a manner to make them not subject to be substantially heated when the food is cooked.

In accordance with the present invention, a vending machine for storing, cooking and dispensing food items, such as hamburgers is provided. The machine includes means for preserving the food, which may be a refrigerator or special packaging, a microwave cooker capable of cooking the food in less than seconds, and means for selectively inserting the food into the microwave oven when the correct change is inserted into the vending machine. The transfer means include a pneumatic device. Means are included to permit a customer to select the degree of cooking desired, i.e. light, medium, or well done. Suitable protective means including shielding are provided to prevent accidental radiation of energy from the microwave cooker during cooking. The food may be disposed in air tight package permeable to microwave energy, which includes an inert gas to permit the food to be stored over a long period of time without refrigeration. Items of food within the package, such as mustard, may be wrapped in material which is impervious to microwave energy. An electrical circuit starts the cycle of machine operations when the correct amount of change is inserted into the vending machine by a customer.

Other objects and advantages of the present invention will be apparent and suggest themselves to those skilled in the art from a reading of the following specification and claims, in conjunction with the accompanying drawing.

For a better understanding of the invention, reference may be had to the accompanying drawings in which:

FIG. 3 is a vertical sectional view taken along the lines 3–3 of FIG. 2, partially rotated, illustrating transfer chutes for transferring the food items from the storage area to the oven, in accordance with the present invention;

FIG. 4 is a side elevational view taken along lines 4–4 of FIG. 3, illustrating the successive positions of movement of the transfer chutes as a packaged food item is moved from storage bins to the interior of the oven chamber;

FIG. 5 is a three quarter perspective view illustrating a food item, such as a hamburger, along with small packages of condiments, and eating utensils, all within a sealed wrapper.

FIG. 6 illustrates a plurality of wrapped food items, similar to that illustrated in FIG. 5, positioned on pivotable holding bins;

FIG. 7 is an alternate form of a package containing food to be cooked, in accordance with the present invention;

Figure 1:
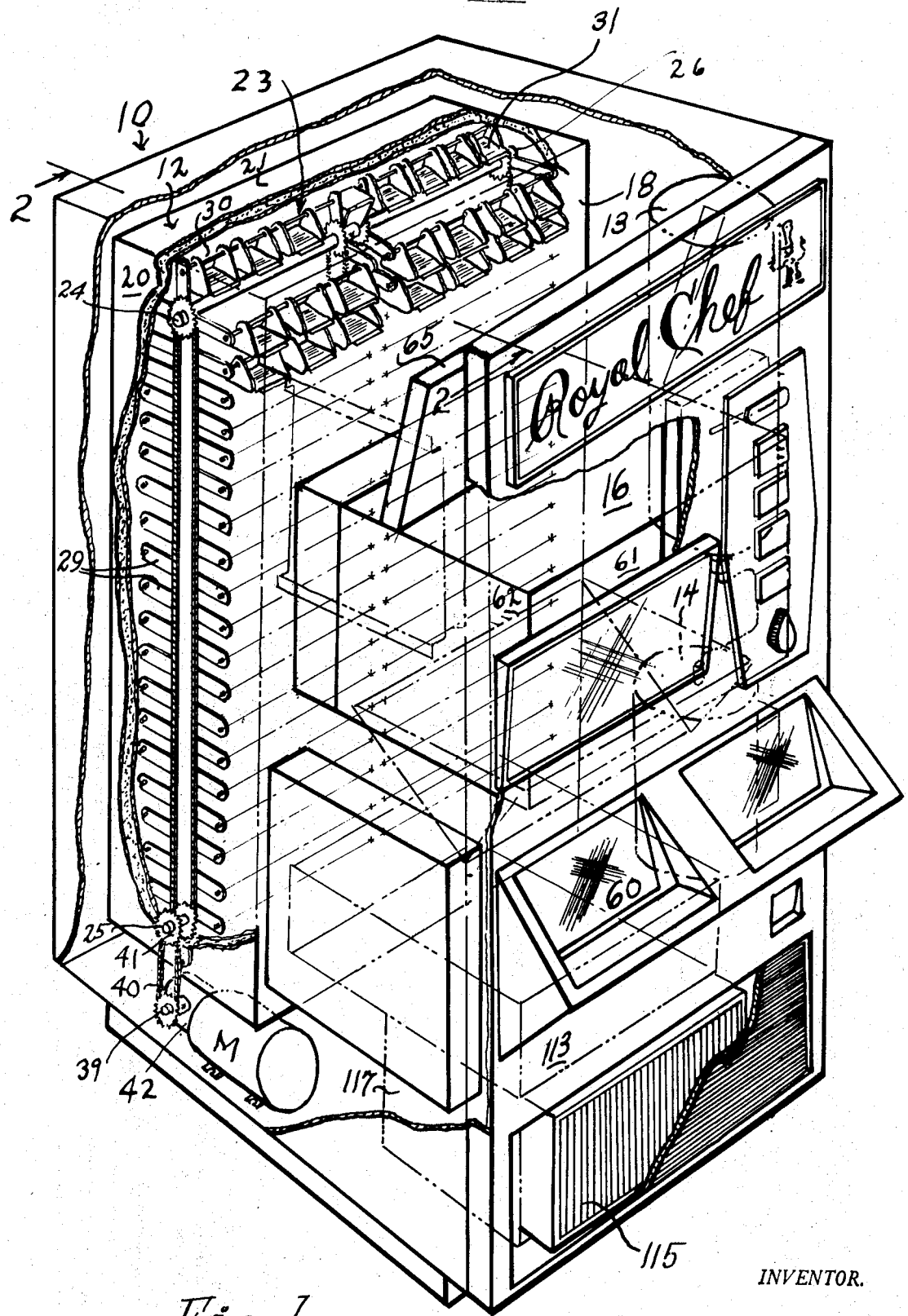
FIG. 1 is a three quarter elevational and partly broken away view of a vending machine embodying the present invention.
Figure 2:
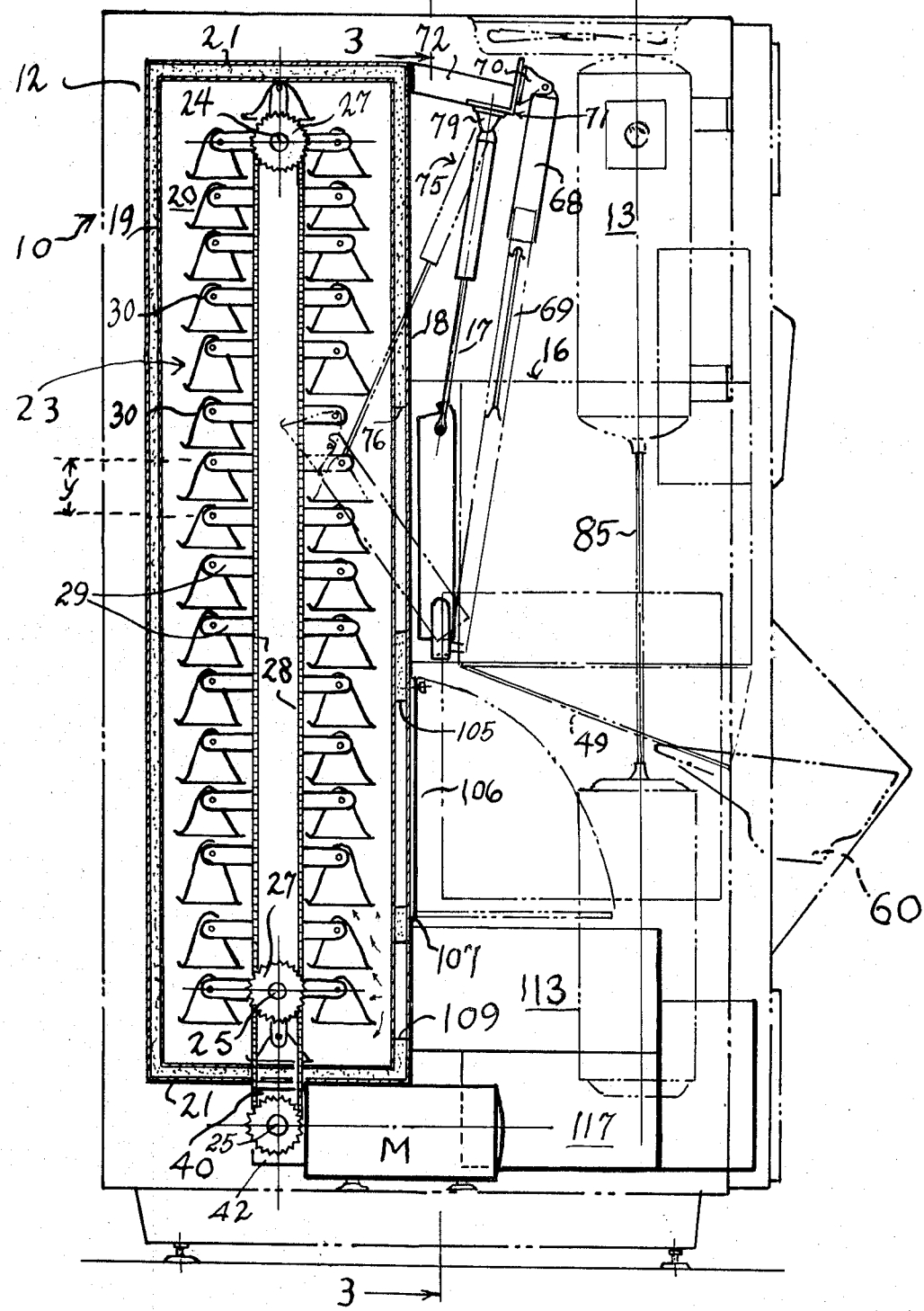
FIG. 2 is a sectional view taken along the lines 2–2 of FIG. 1 illustrating the storage area with food holding bins mounted therein.

As illustrated in FIGS. 1 and 2, the form of the vending machine illustrated includes a rectangular casing 10 which includes a plurality of interior compartments for receiving transferring and cooking mechanisms required for operation. In brief, the food items or products 11 are stored in a refrigerated compartment 12 (FIG. 2). The pneumatic pressurization of an air tank 13 is supplied from an air compresser apparatus 14 and is effective to command start a refrigeration cycle for refrigeration unit 15. A microwave energy unit 16 is positioned forward of the storage chamber 12 and transfer apparatus 17 is provided therebetween to transfer food items from the former to the latter.

As shown, the storage compartment 12 is provided with insulated front and rear walls 18, 19, side walls 20, and the top and bottom walls 21. Holding bin apparatus 23 is suitably mounted within the interior of the storage compartment 12. It includes top and bottom shafts 24, 25 which are suitably journaled for rotation at their outer ends in the side walls 20 of the compartment by means of bearing mounts 26. Each shaft 24, 25 is shown as including two pairs of drive sprockets 27 which are disposed in aligned relationship, top and bottom, to accomodate drive chains 28. Each chain includes a plurality of rigid arms 29 which project at right angles from its line of action. Moreover, the arms 29 of one chain are aligned with those of an adjacent chain in a transverse direction.

A plurality of rods 30 are disposed in horizontal relationship and each is fixed at one of its ends to the extremity of one arm 29 of one chain while its other end is fixed to a like arm 29 of an opposed chain. A plurality of bins 31 is disposed in spaced relationship along each of the shafts 30.

As best seen in FIG. 6, each bin 31 includes a planar base portion 32 with an upstanding spaced apart triangular ear portion 33 extending integrally therefrom. The ear portions are apertured, as at 34, and are threaded on the aforementioned transverse supporting shaft 30 for tilting pivotal movement.

The upstanding ear portions include projecting studs or pins 35 extending from their outer faces to enable the bins containing the food items 11 to be shifted or transferred therefrom in a manner to be later described. In addition, a lip portion 36 is provided at the forward edge of the base 32 of the bin to assist in the transfer operation.

As seen in FIG. 1, the food bins are disposed rowwise relative to the shafts 30 and columnwise in a vertical direction. Motor means M are suitably mounted on the floor of the casing of housing 10 and include sprocket 39, drive chain 40 connected to driven sprocket 41 which is suitably keyed to lower shaft 25 projecting outwardly of side wall 20 of the food storage chamber. A gear reduction unit and revolution counter 42 of conventional form is provided to control the extent of the driving motor M. Each time that the motor M is energized, the sprocket chain 28 carrying the food bins 31 are stepped a vertical distance corresponding to the dimension as indicated by the reference character "Y" which is the distance between two adjacent supporting arms carried on a chain 28.

Referring now to FIGS. 3 and 4, it is noted that the previously referred to microwave energy unit 11 includes a generally boxlike housing 45 which constitutes a shield or enclosure for a source of microwave energy 46, the latter being secured to the inside of its top panel 47. Its opposite bottom panel 48 includes a plate 49 hinged along its rear edge as at 50.

A pneumatic actuating device 51 is suitably secured to the forward edge of the plate 49 as at 52 while its other end is secured to fixed support 53 within the casing of the machine.

Prior to the cook cycle of the oven unit 16, the actuator 51 is energized to close the plate 49 to it full line horizontal position as shown to receive a food package 11 dumped into the oven. Upon completion of a cook cycle, the actuator is energized to its other state to thereby pivot plate 49 to its lowermost inclined position as illustrated in FIG. 4. This enables the cooked food item 11 to slide by action of gravity into a receiving hopper indicated by reference character 60, indicated in phantom lines.

The front of the oven unit includes a front wall 61 which completely seals its front end and opposite side walls 62 including inturned channel track members 63 which are slightly inclined from the vertical direction, being closer to the forward face to the oven at the top and at the bottom.

A rear oven door 65 is normally in its closed downward position as shown. A pneumatic actuator 68 including a rod 69 is suitably affixed to the top edge of the door as at 70. The upper end of the actuator is affixed to an angle member 71 which is suitably secured at its opposite ends to the opposed inside walls of the outer casing 10. Additional bracing at 72 supports the angle member to the top forward edge of the refrigerated storage chamber 12.

In order to transfer the feed items 11 from the refrigeration storage chamber 12 to the microwave energy oven 16, transfer means 75 are provided between the back surface of the microwave oven door 65 and the opening 76 in the front wall 18 of the storage chamber.

The transfer means 75 includes a plurality of pneumatic actuator cylinders 77 and associated chute members 78 corresponding in number to the number of columns of tiltable bins provided in the storage chamber. Each cylinder 77 is secured at its top end by a pivotal connecting bracket 79 secured to the bottom flange of the previously mentioned transverse angle support 70. Each actuator also includes an extensible plunger rod 80 which is hinged by pivot connection 81 to one of the side flanges 82 of chute 78.

As best seen in FIG. 3, each chute member is of elongated channel construction and is mounted at its lower end portion in brackets 83 and is enabled to undergo pivotal movement relative thereto by pivot connectors 85. The upper extremities of the side flanges 82 terminate in hooklike ends 86.

When an actuator 77 is suitably energized, its extensible rod 80 forces the chute to move in a counterclockwise direction, as illustrated in FIGS. 3 and 4, to an extent to cause hook ends 86 to engage the protruding pins 35 of a feed bin 31 (FIG. 6). The clockwise movement continues until both the floor 87 of the chute is aligned and approximately coplanar with the base of the bin, as indicated, in the leftmost position of chute 78 as shown in phantom lines in FIG. 4. This latter action produces a sliding movement of the packaged food item resting in the bin 31 and causes the same to slide down the chute by the action of gravity as indicated by the arrow D. The food item is thereby dumped into the oven 16 and rests on the top surface of plate 49 to await operation of the cook cycle.

In operation, the plurality of bins containing the food items are moved by the chain drive each time a customer inserts the proper coins into the vending machine and starts the cycle of cooking operation. The system provides that all of the food items will be disposed of rowwise and columnwise until all the food items have been dispensed. Means are then provided to indicate that the machine is empty. At this point, no money will be accepted by the machine and suitable indicator lights may be lighted. Such features relating to sequentially switching from rows and columns as packages are dispensed and indicating "empty" are conventional and therefore will not be discussed in detail.

FIGS. 5 and 7 illustrate different types of food packages which may be used with the machine described. The package 11 of FIG. 5 may include a package including a hamburger 166, aluminum wrapped packages 168, which may, for example, include condiments, such as mustard, catsup and the like, which need not be cooked, and eating utensils 170, which may include a plastic knife and fork.

The wrapping for the package may be a transparent plastic which is permeable to microwave energy to permit the microwave energy to radiate into the hamburger causing it to become cooked. At the same time, the items, such as the condiments are not cooked because they are wrapped in aluminum which is not penetrated by the microwave energy. Likewise, the eating utensils are treated so that they will not become excessively heated.

The package illustrated in FIG. 7 is basically the same as the one illustrated in FIG. 5 except that it illustrates that the package need not be limited to a hamburger but may include an entire meal including desert. The package 172 includes an inner package 174 which may include a meat and two vegetables to be heated, an aluminum wrapped package 176, which may include pie or other desert and a small package 178, which may include condiments. Eating utensils 180, which may include a plastic knife, fork or spoon, may also be included in the package 176.

One of the features of the present invention resides in the type of packaging as used with a vending machine. The packages illustrated in FIGS. 5 and 7 may be sealed from the atmosphere to prevent air from entering. The packages preferably includes nitrogen gas. The presence of nitrogen gas helps preserve the food within the packages for long periods of time. This permits the packages of food to be stored in the vending machine over relatively long periods of time without refrigeration.

Means for evacuating the packages and injecting the nitrogen gas may be done at the packing house by conventional vacuum pumping and pressure pump means. Inlets and outlets to the packages may be sealed at the packing house after oxygen has been removed and nitrogen is injected into the packages.

It is noted that when the packages illustrated are used with a microwave cooker that the wrappings are not subject to excessive heat and the food may be cooked without the necessity of removing the food from the package. This is in contradistinction to when ordinary heaters or infrared ovens are used. The ordinary heating ovens cause it to become excessively hot creating the possibility of ignition of the wrapper on the package.

It is further noted that the cooking of the food when it is in wrapped condition prevents grease from splashing within the oven thereby minimizing the problems associated with unwrapped food when it is cooked.

Figure 8:
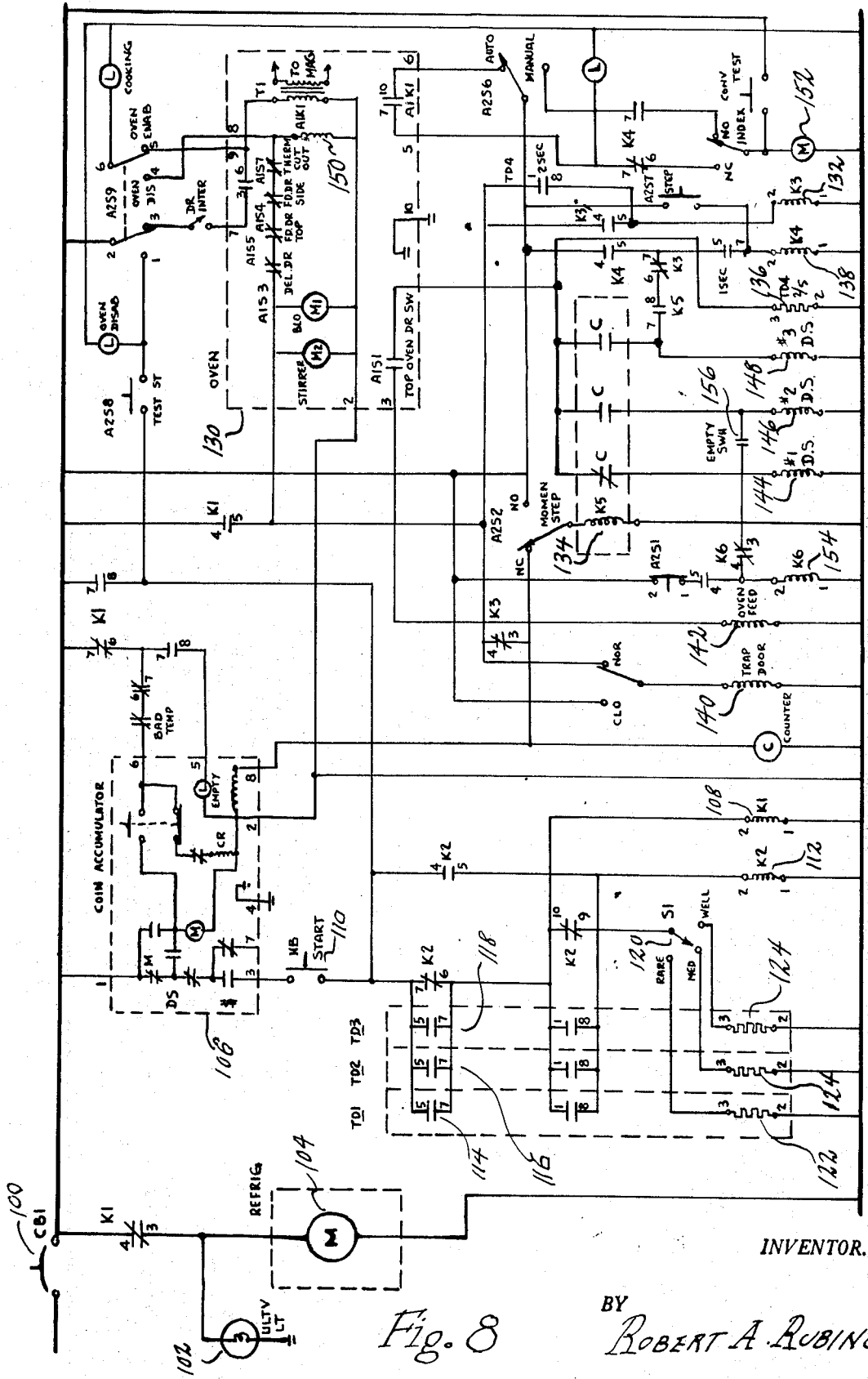
FIG. 8 is a schematic diagram of an electrical circuit for performing various operations relating to the vending machine, in accordance with the present invention.

Referring particularly to FIG. 8, there is illustrated one type of electrical circuit which may be used to control the various mechanical functions previously described. Some of the electrical components, such as for example, that associated with the coin accumulator and microwave oven is conventional in design and available commercially. Consequently, this circuitry will not be described in great detail because such circuitry is well known to these skilled in the art.

In general, if the correct amount of money (which may involve a return of change) is put into the vending machine, a predetermined cycle of operations will follow. If the machine is empty or if not enough money is put into the machine, the money may be returned or various indicators will be actuated. Vending machines wherein indications of "empty" or incorrect change or refusal of the machine to accept change when empty are all features found in conventional machines used heretofore.

Consider first the cycle of operations which normally takes place when the correct change is inserted into the vending machine and cooked foods are to be dispensed from the machine to the consumer. The mechanical sequence of operations may generally be as follows:

a. The trap of the oven closes.
b. The tray with the food package is readied to be put into the oven.
c. The back of the oven opens.
d. A pneumatic device deflects the tray holding the food package causing it to be dumped into the oven.
e. The rear door of the oven closes.
f. The microwave oven starts to heat the food within the package.
g. After a predetermined short period of cooking, the oven shuts off.
h. The trap door of the oven opens causing the cooked food package to be released from the oven through a chute to a consumer.

The circuit of FIG. 8 includes the means for performing all of the above functions as well as many of the conventional functions previously referred to.

In general, the present invention utilizes double action thermal timers in conjunction with AC holding relays to sequence and control the cook cycle. Specific variations in the automatic cycle may be introduced by a customer by manual controls on the vending machine. A number of mechanical sensing switches provides interlocks for both safety and control over the automatic cycle.

Referring to FIG. 8, a source of power, which may be a 110 or 220 AC volt source, is applied through a main power switch 100 to an indicator light 102 and a motor 104. The indicator light indicates that power is being applied to the vending machine and the motor is actuated to control a refrigerator unit if such a unit is used in some eases food package with nitrogen previously mentioned may be employed thereby eliminating the need for conventional refrigeration.

Power is also applied to a coin accumulator 106. This accumulator may be of the type SCS Accumulator, 10—14 and 10—18 Series, made by National Rejectors, Inc. for example. The purpose of the accumulator will normally return coinage when a coin return switch is pressed, provided the automatic cycle has not been initiated. The circuitry within the accumulator is arranged so that the accumulator will not accept coinage when the conveyer bins previously mentioned are empty or in the event of a refrigerator malfunction, if such a refrigerator is used. The accumulator 106 will collect deposited coins when the relay 108 (K1) is actuated. This occurs when the start switch 110 is pressed by a customer, for example.

Primary control of the system is performed by the relay 108 (K1) and relay 112 (K2) in conjunction with thermal timers 114, 116, and 118. A switch 120, which may be controlled by a customer, selects one of the heating elements 112, 124, or 126. The particular heating element selected determines the duration of the heating cycle, thereby making it possible for a customer to have his hamburger, for example, rare, medium or well done.

The thermal timers 114, 116 and 118 are double contact, double acting units in which a heated bimetallic strip displaces, actuating contacts 5/7 and 1/8 in that order. As the bimetallic strip cools, contacts 1/8 and 5/7 open in that order. Thermal timers of this type are conventional devices and their operations are well known to those skilled in the art.

The contacts 5/7 of the selected thermal timer (i.e. one of the timers 114, 116 or 118 selected) provide holding current to lock relay 108 (K1) for the cycle. When the contacts 1/8 of the selected thermal timer closes, the relay 112 (K2) is actuated. This causes the timer heater power to be removed for the remainder of the cycle. As the timer cools, contacts 1/8 open but nothing happens to relay 112 which is also energized through contacts 4/5. At the end of the cooling period, contacts 5/7 open, dropping power to the relay 108 (K1) ending the cycle.

The main cycle of operation described, among other things, controls the time duration of operation of microwave oven 130. Such microwave ovens are available commercially. Such an oven, for example, may be of the type manufactured by Raytheon Company in Waltham, Massachusetts, and may be similar to Models J-1012 and J-1014. Such models, sold under the trademark Radarange, generally includes the plate and filament transformers, a magnetron, suitable power supplies, interlocks, switches, circuit breakers and other circuitry required for the satisfactory safe operation of the oven.

The microwave oven employed is designed to overcome the problem of getting uniform heating of whatever is put into the cavity. Any resonant mode has a standing wave pattern of field strength so that the heating produced has unvarying high and low intensity regions. One way of smoothing this pattern is to move the material within the field. Also the pattern may be done by changing the shape of the cavity. Using a "mode sterile" which often has the form of a fan like metal blade rotating within the cavity. Another approach is to vary the supply frequency or use multiple sources with different frequencies or field orientation at the feed point to the cavity. While the basic concept of utilizing a microwave oven is important to the present invention, it is apparent that the structural features of such an oven may take a wide variety of forms. In the interest of clarity and because specific features are well known to those skilled in the art, detailed descriptions of all the features and controls of the oven will be omitted.

A relay 132 (K3), a stepper switch 134 (K5), and thermal timer 136 (TD4) control the function of sequencing the mechanical movements required to open and close the oven feed door and to actuate the appropriate trip mechanism.

A relay 138 (K4) controls the conveyer indexing mechanism by controlling the opening and closing of contacts 5—7 on stepper switch 134 (K5).

The so called subcycle of operation begins when relay 108 (K1) is actuated and ends with conveyer indexing. When the relay 108 (K1) is actuated at the beginning of the cycle, power is applied to the delivery door solenoid 140 causing it to close. Power is also applied through the oven feed door solenoid 142 causing the oven feed door to open. At this point, the stepper switch 134 (K5) completes a new circuit from the oven feed door top switch to one of the three trip solenoids 144, 146, or 148.

When the oven feed door actuates the top switch, power is applied to the selected trip solenoid 144, 146 or 148 and to heater element 136 (TD4). As the timer heats, contacts 5—7 close thereby enabling the relay 138 (K4) to permit indexing. Contacts 1—8 subsequently close to energize relay 132 (K3) which locks up on its own contacts for the remainder of the cycle.

Actuation of the relay 132 (K3) results in the removal of power from the stepper switch 134 (K5), the oven feed door solenoid and the heater element 136 (TD4). With the closure of the oven feed door, all serial interlocks within the oven 130 are satisfied and oven relay 150 (A1K1) is energized which results in voltage being applied to the magnetron power supply thereby initiating the actual cook cycle within the oven.

Automatic indexing of the conveyer mechanism is performed as an adjunct of the previously described subcycle. During the actuation of trip solenoid 148, power is applied to relay 138 (K4) through contacts 5—7 of switch 134 (K5), contacts 6—7 of relay 132 (K3) and contacts 5—7 of thermal timer 136 (TD4). Actuation of relay 132 (K3) leaves relay 138 (K4) dependent only on contacts 5—7 of thermal timer 136 (TD4). Actuation of relay 138 (K4) enables a circuit from the magnetron control or oven control relay 150 (A1K1) to a conveyer motor 152. Power is removed from the motor when the conveyer reaches its index position.

An indication that the vending machine is empty is controlled by the actuation and locking in of relay 154 (K6). When the conveyer has rotated 360°, a sense switch is actuated by means which may be a special jig disposed on the third or last position of the conveyer. No such means are associated with the other positions of the conveyer. During the energization of relay 146 (position number 2 in conveyer system), power is applied to the relay 154 (K6) through a switch 156, which may be considered the "empty" switch. Actuation of the relay 154 (K6) prevents the accumulator 106 from accepting coinage.

A counter 158 is provided for indicating the number of items dispensed from the vending machine. It is actuated once per cycle.

A number of manual controls are provided in the system to permit a serviceman to load and service the vending machine. These controls permit both indexing and running of the conveyer, test operations of the system with or without the oven 130 being disabled, manual operation of the delivery door and sequencing the stepper switch 134 (K5). Because the these operations are conventional and not related to the present invention, they are not discussed in detail for purposes of clarity.

The basic electrical system described may of course be modified by substituting for the circuitry disclosed some of the devices recently developed. For example, various semiconductor devices may be employed extensively throughout to minimize size and increase reliability. Unijunction transistors pulse generators could be used to drive digital count down registers. Timing could be obtained by logic circuits responsive to these registers. With some modification suggested by modern known technology, a system is envisionaged wherein variable cook times for a large number of stored items may be provided for simultaneous cooking.

Figure 9:
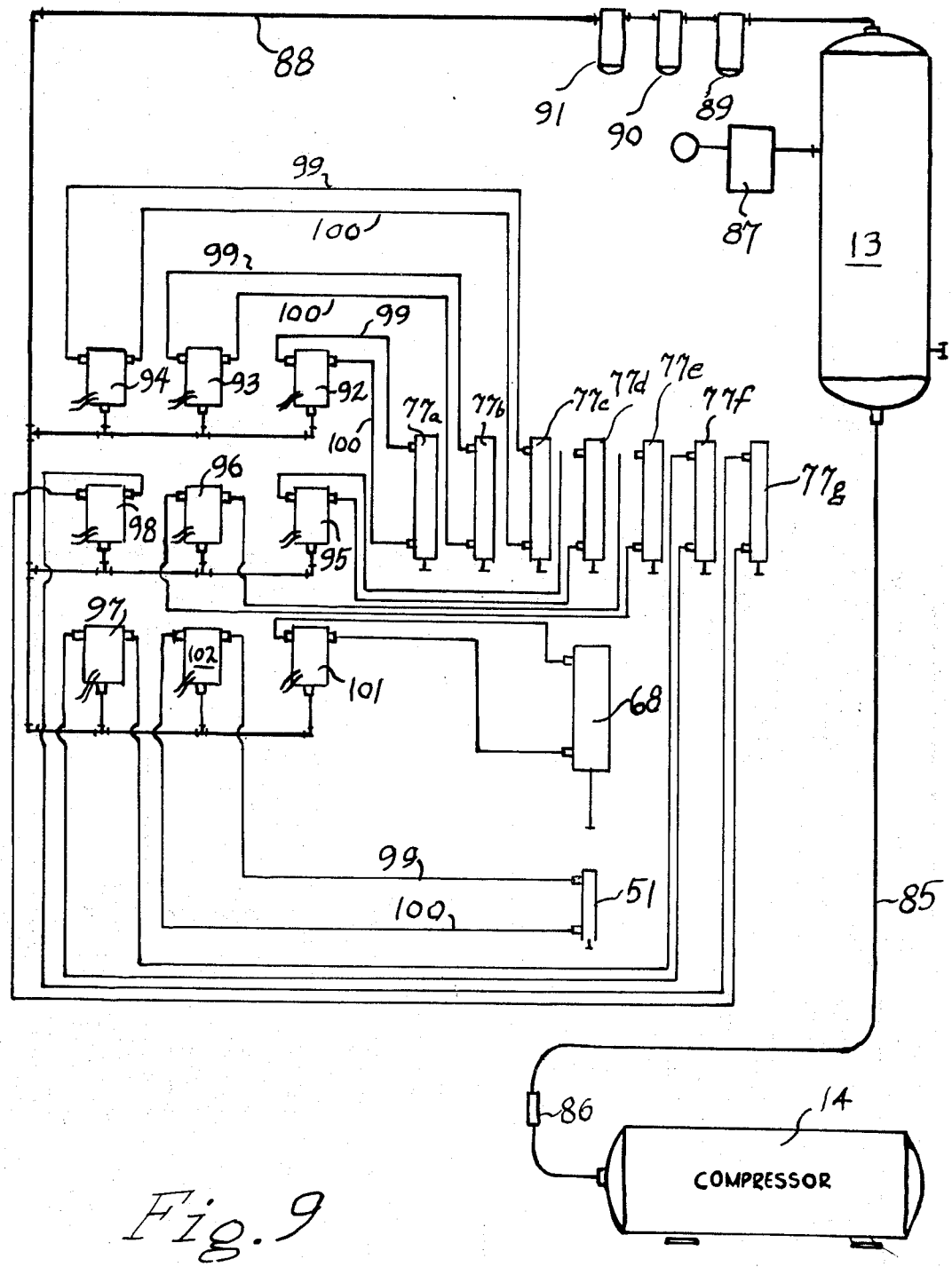
FIG. 9 is a schematic diagram of a pneumatic system including various cylinders for actuating transfer chutes, in accordance with the present invention.

Referring now to FIG. 9 as well as FIGS. 1, 2 and 3, the schematic representation of the pneumatic apparatus for the vending machine is shown as including a compressor 14 connected by a line 85 with a check valve 86 to the previously mentioned storage tank 13. A suitable pressure regulator 87 is provided to control the pressure delivered from the tank 13 to the dump cylinder actuators 77a to 77g inclusive by means of delivery line 88. The latter line includes conventional purifier apparatus 89, filter apparatus 90, and lubricator means 91. Each of the dump cylinder actuators 77a—77g include associated solenoid valve means 92 to 98 inclusive respectfully. Each solenoid valve means includes first and second lines connected to opposite ends. Though the actuator 77a is shown for example connected at its top end by line 99 and at its opposite end by line 100. The plunger rod 80 is normally in its retracted position when its solenoid valve means 92 is actuated to a first state, the plunger position as shown in phantom FIG. 4 to tilt the chute 78. When however the valve means is energized to its opposite state the plunger rod 80 is withdrawn as shown on the chute 80 is in vertical position as indicated by its full line position. In a similar manner the oven lift door actuator 68 includes a solenoid valve means 101, while the bottom door actuator 51 includes a similar arrangement.

Referring now to FIG. 2, in order to enable the food storage chamber 12 to be filled and replenished with packaged food items 11 the front wall 18 of the chamber includes opening 105 therein. A door 106 hinged as at 107 normally covers the opening 105. When the front door of the cabinet 10 is swung open, the storage chamber door may be hinged to its open position corresponding to its horizontal phantom line position as shown. Still another opening 109 is provided beneath opening 105 in the front wall 18 of the storage chamber. The above mentioned refrigeration unit 15 includes air intake means 115, condensor and evaporator means 117 and refrigerator compressor and fan means 113 all of well-known construction. The unit is effective to draw air from the outside of the vending machine through intake means 115 where it is suitably processed in the condensor evaporator means 117. Thereafter, the air is drawn through the refrigerator compressor unit where it is cooled and is then blown into the cavity of the storage unit 12 to keep, the food stored therein at a suitable storage temperature.

It has thus been seen that the subject invention has provided a novel food vending machine for dispensing cooked food almost instantly when a customer inserts the proper change therein. This convenience to the customer, who need not wait for service, tends to greatly enhance the sales of the food items stored thereby providing a profitable operation for the machine owner.

In addition to the fast service, the type of packaging employed permits the food items to be stored over a long period of time and the clean cooking results in a minimum of maintenance problems. The novel transfer mechanism provides quiet, fast efficient operation.

It is apparent that the machine described may take on a variety of different forms without departing from the scope of the present invention. For example, with some modifications it is possible to cook more than one meal simultaneously with each of the meals being cooked at different temperatures or for different times. The machine operations may of course be combined with other types of machines which dispense coffee, cold drinks, ice cream or the like.

I claim:

1. In a vending machine for vending food items, such as hamburgers and the like, the combination comprising a refrigeration storage chamber, means including a plurality of tiltable trays for holding said food items within said storage chamber, a microwave energy source, shielding means surrounding said microwave energy source and defining an oven chamber, said shielding means including access means to enable entry of said food items into said oven chamber, means adjacent said access means for successively indexing said plurality of trays, transfer means for transferring said food items from said means for holding into said oven chamber, said transfer means including chute means mounted for movement between a first position to cooperatively engage and tilt one of said tiltable trays to cause said food items to be slidably moved from one of trays to said chute means and into said oven chamber and a second position out of engagement with said trays to enable indexing of said means for holding, means for moving said chute means between said first and second positions, means for energizing said microwave energy source to cause said food items transferred into said oven chamber to be cooked, and said shielding means further including means for ejecting said cooked items from said oven chamber.

2. In the vending machine as set forth in claim 1 wherein said chute means are mounted for pivotal movement, and said movable means include pneumatic actuator means for moving said chute means between said first and second positions.

3. In the vending machine as set forth in claim 2 wherein said access means constitutes a closure panel for said oven chamber, said closure panel being movable between an open position to enable food items to be slidably moved along said chute means and into said oven chamber, and movable to a closed position to prevent escape of microwave energy upon energizing said microwave energy source.

4. In the vending machine as set forth in claim 3 wherein said ejecting means includes a panel and actuator means connected with said panel for moving the same from a first position in which said food items are enabled to be supported while being cooked and for preventing the escape of microwave energy outside said oven chamber, and to a second position wherein said food items are enabled to slide by gravity outside said chamber.

5. In the vending machine as set forth in claim 4 wherein said actuator means include pneumatic cylinder means associated with said panel for moving the same between its first and second positions.